(12) United States Patent
Walter et al.

(10) Patent No.: US 7,486,693 B2
(45) Date of Patent: Feb. 3, 2009

(54) TIME SLOT PROTOCOL

(75) Inventors: Randy L. Walter, Ada, MI (US); John L. Schroeder, Byron Center, MI (US); Gerald W. Vanbaren, Ada, MI (US); Donald G. Hodges, Kentwood, MI (US); Courtney L. Albers, Grand Rapids, MI (US)

(73) Assignee: General Electric Company, Schnectady, NY (US)

( * ) Notice: Subject to any disclaimer, the term of this patent is extended or adjusted under 35 U.S.C. 154(b) by 1185 days.

(21) Appl. No.: 10/106,705

(22) Filed: Mar. 26, 2002

(65) Prior Publication Data

US 2003/0115369 A1 Jun. 19, 2003

Related U.S. Application Data

(60) Provisional application No. 60/340,614, filed on Dec. 14, 2001.

(51) Int. Cl.
*H04J 3/16* (2006.01)
(52) U.S. Cl. .......................... 370/437; 370/442
(58) Field of Classification Search ............ 370/442, 370/443, 444, 445, 447, 448, 526
See application file for complete search history.

(56) References Cited

U.S. PATENT DOCUMENTS

| | | | | |
|---|---|---|---|---|
| 5,694,542 | A | 12/1997 | Kopetz | 395/185.02 |
| 5,761,430 | A | 6/1998 | Gross et al. | 395/200.55 |
| 6,011,801 | A | 1/2000 | Solomon | 370/439 |
| 6,145,008 | A | 11/2000 | Kopetz | 709/236 |
| 6,188,912 | B1 | 2/2001 | Struhsaker et al. | 455/561 |
| 6,246,702 | B1 | 6/2001 | Fellman et al. | 370/503 |
| 6,266,350 | B1 * | 7/2001 | Ojard et al. | 370/526 |
| 6,292,482 | B2 | 9/2001 | Pickett | 370/352 |
| 6,385,190 | B1 | 5/2002 | Malkamaki et al. | 370/347 |
| 6,463,089 | B1 * | 10/2002 | Chauncey et al. | 375/131 |
| 6,466,607 | B1 * | 10/2002 | Chauncey et al. | 375/131 |
| 6,788,924 | B1 * | 9/2004 | Knutson et al. | 455/265 |
| 6,804,249 | B1 * | 10/2004 | Bass et al. | 370/412 |
| 6,834,057 | B1 * | 12/2004 | Rabenko et al. | 370/468 |
| 6,847,619 | B2 * | 1/2005 | Zscheile et al. | 370/322 |
| 6,891,841 | B2 * | 5/2005 | Leatherbury et al. | 370/401 |
| 7,218,623 | B1 * | 5/2007 | Proctor, Jr. | 370/335 |

(Continued)

*Primary Examiner*—Phirin Sam
(74) *Attorney, Agent, or Firm*—William Scott Andes (57) ABSTRACT

A computing network uses Time Division Multiplexing (TDM) to divide the time on a bus into a plurality of frames, each frame having a plurality of time slots. Each time slot is assigned no more than one of the plurality of devices within a collision domain, the assignments indicating the identity of the device permitted to transmit packets onto the network during the assigned time slot. A bus cadence unit simultaneously sends an epoch packet initiating the frame. The epoch packet contains a time slot assignment table containing the time slot assignments, the device identification, as well as a time slot offset and duration. Each device on the network is configured to measure a frame interval between repeating epoch packets. The measured frame interval is further processed in each receiving node to obtain a calibrated frame interval. The calibrated frame interval is used to accurately synchronize transmissions of data from the various devices onto the network. A time slot protocol governor in each node controls access to the bus to only the assigned time slot or slots using the calibrated frame interval to reduce or eliminate synchronization errors.

33 Claims, 7 Drawing Sheets

U.S. PATENT DOCUMENTS

2002/0034194 A1* 3/2002 Young et al. ................ 370/498
2006/0104301 A1* 5/2006 Beyer et al. ................ 370/445
2008/0056185 A1* 3/2008 Alapuranen et al. ......... 370/329

* cited by examiner

| | | | Reference Bus Attributes | | | |
|---|---|---|---|---|---|---|
| Network Protocol Mode | Frame Time | Frame Time Tolerance | Frame Jitter Tolerance | Epoch Timeout Tolerance | Filter K | |
| Time Slot Assignment Table | | | | | | |
| Slot Number 1 ⋮ N | Note I.D. | Slot Time Offset from Epoch | | | Slot Duration | |

TIME SLOT PROTOCOL

RELATED APPLICATIONS

This application claims the benefit of U.S. provisional application Ser. No. 60/340,614 filed Dec. 14, 2001, hereby incorporated by reference in its entirety.

BACKGROUND OF THE INVENTION

1. Technical Field

This invention relates generally to computing networks and, more particularly, to a system and method for a time slot protocol for such computing networks.

2. Description of the Related Art

It is known for real-time systems to utilize point-to-point data buses to ensure that data delivery is deterministic with low jitter. However, with increasing complexity of real-time systems, the use of point-to-point connections becomes impractical, because the number of interconnections becomes unwieldy. Exacerbating the problem is the fact that point-to-point buses use separate transmit and receive media, and quite often require redundancy to ensure availability. Such an approach results in an architecture that creates a "cobweb" of wiring, with devices that require an increased number of parts, both factors driving the cost of a system consistent with such an approach in an upward spiral. One proposed solution to these problems is to use a shared media network. One such shared media approach is known as Ethernet.

Ethernet is a standard networking technology in wide use today. Ethernet, however, suffers from being unpredictable regarding the timely delivery of periodic data. This drawback is due in part to the lack of control on when a device on the network can transmit, and, the method defined by the Ethernet standard to resolve contention for the bus. In particular, Ethernet uses a carrier-sense multiple access with collision detection (CSMA/CD) media access control protocol. Collisions on the bus between two or more devices seeking to transmit at the same time may result in potentially high time latencies for the data sought to be transmitted by stations on the bus. While such high latencies may be tolerated for basic computer data, which in general may comprise asynchronous data, such characteristics are unacceptable for real-time embedded control systems that require communication of data between system elements in a methodical, deterministic fashion to perform the intended real-time tasks. A need therefore arises to configure Ethernet to maintain a desired level of determinism and low jitter, as characteristic of conventional point-to-point communication architectures.

One approach in the art that purports to provide a solution to Ethernet's shortcomings involves establishing a reservation system over Ethernet, as seen by reference to U.S. Pat. No. 5,761,430 to Gross et al. entitled "MEDIA ACCESS CONTROL FOR ISOCHRONOUS DATA PACKETS IN CARRIER SENSING MULTIPLE ACCESS SYSTEMS." Gross et al. disclose a reservation system wherein two communication "channels" are time division multiplexed (TDM) over the shared media. One "channel" is asynchronous and is provided for allowing devices connected to the shared media to submit requests for bandwidth to a master device (a "conductor"). The second "channel" on the shared media has a plurality of time intervals and is provided for carrying isochronous data packets generated by the various devices in the specific order arranged by the conductor, based on the reservation requests (the order being set forth in a reservation list). The two "channels" together define a frame, which is repeated over and over. A problem with the system proposed in Gross et al. relates to the synchronization scheme. In particular, synchronization in Gross et al. relies on a timing packet broadcast by the conductor (the timing packet also includes the reservation list). Transmission of packets by the various devices on the network are triggered directly off of the timing packet, in combination with timers and the like in the devices, all operating according to the reservation list (and certain deferral times). Gross et al. assume that precision timing corrections are made (i.e., propagated) throughout the network on a frame-by-frame basis, which may not, in-fact, occur with a needed degree of certainty. The resulting timing uncertainty and undesirably large amounts of jitter may affect the performance of the system disclosed in Gross et al. While such performance shortcomings may be tolerated from time-to-time when the payload being carried involves audio and/or video data, such shortcomings are generally unacceptable for real-time embedded control systems, especially where safety is concerned.

Another problem with the system in Gross et al. is that it is not strictly deterministic. Specifically, access to the network requires that both (i) a request be made during a reservation phase (i.e., which may be unsuccessful due to its asynchronous nature, which can result in possible collisions), and (ii) that the conductor actually grant the request and place the device on the reservation list for the next frame (this is not guaranteed to happen). That is, in the system of Gross et al., there can be no absolute assurance that each device will be allowed access to the shared media every frame.

Still another problem with Gross et al. is the mechanism used by the network devices for determining when it is permissible to transmit. Gross et al. disclose a deferral time associated with each device corresponding to the priority or scheduled order of transmission on the bus. A timer counts its designated deferral time so long as the bus is quiescent. If the timer completely counts down its deferral time, it can transmit. Otherwise, if the device detects activity on the bus, it restarts its timer countdown of the deferral time. This approach introduces inefficiencies and uncertainty into the transmission process.

Another approach disclosed in the art involves time division into a plurality of frames wherein each frame contains a plurality of dedicated time slots or "phases" during which real-time traffic may be transmitted, as disclosed in U.S. Pat. No. 6,246,702 issued to Fellman et al. entitled "METHODS AND APPARATUS FOR PROVIDING QUALITY-OF-SERVICE GUARANTEES IN COMPUTER NETWORKS." In Fellman et al., each of the phases is assigned to a respective device adapter. Each of the device adapters is allowed to transmit packets only during the assigned phase. One problem with the system of Fellman et al. is that is focuses on latency introduced by unknown network configurations, taken on a near-end-to-far-end basis. And while Fellman et al. recognizes the problem of variation in clock frequency on a device-to-device basis, which can cause drift one device relative to another, resulting in collisions, the solution proposed by Fellman et al. is restrictive. Particularly, the solution proposed by Fellman et al. involves the use of a specialized variable crystal oscillator (VXO), thus requiring specialized hardware, increasing cost and complexity.

Another problem with Fellman et al. involves the mechanisms for handling synchronization failures. In particular, the system of Fellman et al., if a synchronization mismatch occurs, relies on the underlying CSMA/CD Ethernet protocol to recover from collisions. Fellman et al. disclose that there should be no collisions so long as the phase overlap does not exceed the time duration of a minimum-size packet. However, as referred to above, in real-time embedded control systems, such a loss of deterministic access to the network is unacceptable. For example, a "babbling" node (i.e., a misbehaving node) could bring down such a network.

Accordingly, there is a need for a system and method for allowing deterministic access to a shared network media that minimizes or eliminates one or more of the problems set forth above.

SUMMARY OF THE INVENTION

One object of the present invention is to provide a solution to one or more of the problems as set forth above. The present invention uses a time division multiple access (TDMA) scheme that allows implementation of a deterministic, reliable and high throughput computing network with low latency and low jitter. The invention is particularly suited for real-time embedded control systems, for example, for avionics applications. The time on the bus is divided into a plurality of frames, each frame having a plurality of time slots. To establish deterministic access, according to the invention, all network devices (or nodes) having a need to transmit data are provided access only in preassigned distinct time slots (i.e., no two devices are assigned to the same time slot). The invention thus allows all devices deterministic, periodic access to the shared media (i.e., bus) without contention. The invention also includes mechanisms (i) to ensure proper synchronization using calibration techniques, and (ii) to ensure each device transmits only in its assigned time slot. Thus, one advantage of the present invention involves its strict adherence to deterministic access to the bus. Another advantage of the present invention involves adaptability in the periodicity and length of guaranteed network access. Yet another advantage of the present invention is that it provides for safe and reliable operation of real-time systems operating thereover inasmuch as the timesharing scheme according to the invention utilizes mechanisms to detect and isolate any failures that may occur in the physical media and/or network nodes.

In one aspect of the present invention, a method of operating a network is provided. The network includes a plurality of devices connected to a shared bus of the network. The method involves transmitting an epoch packet indicative of the beginning of each frame. The epoch packet thus comprises timing information. In addition, the epoch packet has a table including (i) time slot assignments for devices on the bus, (ii) a time slot offset for each time slot assignment, and (iii) a time slot duration for each time slot assignment. The frames are repeated over and over. The method further involves controlling access to the bus during the assigned one or more time slots using the time slot offset and duration data.

In another aspect of the present invention, an additional step involves assigning to each time slot no more than one of the plurality of the devices within a collision domain. The assignments indicate the identity of the device permitted to transmit packets onto the bus during the assigned time slot(s). A further step involves defining the above-mentioned table that includes such time slot assignments, and time slot offset and time slot duration data for each time slot. A still further step involves broadcasting the table over the bus to each of the plurality of devices in the epoch packet. Each device is configured to determine its transmission time based on its assigned time slot, offset, and slot duration, all taken from the table. The transmission duration is enforced, in one embodiment, with an independent transmission envelope counter that, in-effect, restricts transmission of packets by the device to only its assigned time slot. Preferably, this enforcement may be made using hardware gating logic.

In still another aspect of the invention, the effects device-to-device clock frequency variation is reduced using a frequency calibration parameter. The parameter may be a calibration ratio calculated using a weighted average of measured frame intervals. The calibration ratio is used to calibrate the slot offset, slot duration and frame interval parameters that are used by the device in determining its assigned time to transmit on the bus without collision. The calibration allows increased utilization of the bus inasmuch as a guard band at the beginning and at the end of each time slot can be reduced, leaving more bandwidth for payload. In addition, the calibration mechanism also allows the devices to operate for a much greater period of time in the event of a bus cadence unit, which establishes the timing on the bus for all the device connected to An adapter according to the invention is also presented.

Other aspects, features, and advantages of the present invention will now become apparent to those of ordinary skill in the art from the following detailed description taken in connection with the accompanying drawings illustrating the invention by way of example, but not by way of limitation.

DETAILED DESCRIPTION OF THE PREFERRED EMBODIMENTS

Figure 1:
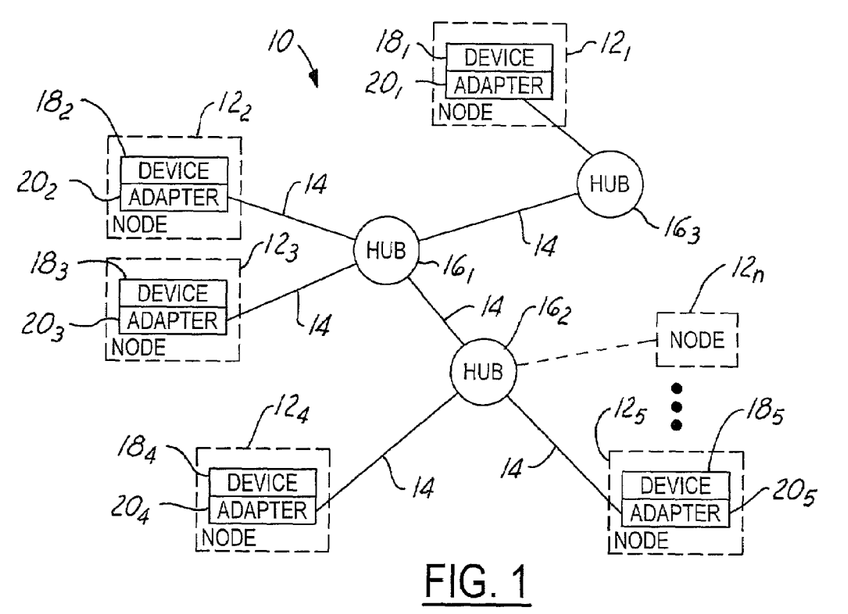
FIG. 1 is a simplified block diagram view of a computing network according to the invention which includes various nodes, each having a device and an associated adapter.

Referring now to the drawings wherein like reference numerals are used to identify identical components in the various views, FIG. 1 is a block diagram view of a network 10 according to the invention. The present invention may be implemented over a wide variety of networks and shared media or bus types, and will be described in connection with a preferred embodiment implemented over an Ethernet network. It should be understood, however, that the present invention is not limited to an Ethernet network and further is not limited to a Carrier Sense Multiple Access (CSMA) with Collision Detection (CD) access protocol. The present invention may be usefully deployed for a wide variety of applications, and is particularly suited for real-time embedded control applications where strict deterministic access to the network, and low jitter, are required. In one embodiment, network 10 may be an avionics communications network.

As shown in FIG. 1, network 10 includes a plurality of nodes $12_1$, $12_2$, $12_3$, $12_4$, $12_5$, ... $12_n$, one or more buses 14 (i.e., shared media) interconnected, optionally, by one or more hubs $16_1$, $16_2$, $16_3$ and/or repeaters/switches/routers (not shown). Each node 12 may include a respective device 18 and adapter 20.

Device 18 may be any computing device that requires access to computing network 10, specifically, access to the bus 14, for transmitting packets of data. For example, device 18 may comprise a general purpose computing device or a special purpose computing device, or a special purpose data acquisition device (e.g., a sensor or the like). In an avionics embodiment, device 18 may comprise any one or more of the following: an application specific unit (ASU), an avionics computing resource (ACR), or a remote data unit (RDU). The ASU may be a single computer that runs a single application. An example of an ASU may be a VHF radio. An ACR is a general purpose computer running, in the avionics embodiment, an ARINC 653 compatible operating system that can host several partitioned applications. The RDU may be a simple computer unit that performs local function control, for example A/D and D/A processing, and which may interface RDU digital data to an ACR and for an ASU. Of course, the foregoing is exemplary only, and not limiting in nature.

Adapter 20 is configured to allow device 18 access to bus 14 for transmitting packets. In particular, adapter 20 is configured to control access to network 10 during one or more time slots selected from a plurality of time slots defining a frame. The one or more time slots are assigned to a particular device 18, in a preferred embodiment, during the design of the network, as will be described in greater detail below.

Bus 14 and hubs 16 may comprise conventional components known to those of ordinary skill in the art. Bus 14 is the shared media in network 10 over which communications occur. For example, bus 14 may comprise twisted pair shielded wiring, as known. Hub 16 may be configured for carrying Ethernet traffic (i.e., IEEE-802.3 compliant components) and allows communication of nodes 12 with each other.

Although not shown, certain nodes 12 may be interconnected through redundant (e.g., 2 or 3 buses total) buses 14, as known in the avionics industry.

Figure 2:
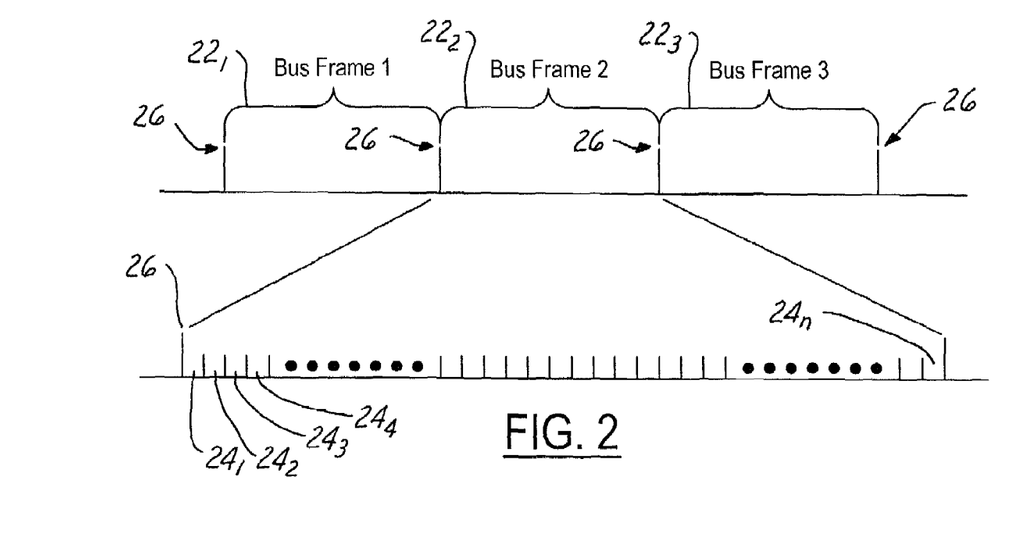
FIG. 2 is a simplified timing diagram showing the relationship of time slots to frames.

FIG. 2 is a simplified representation of the architecture used by the present invention. The present invention utilizes a Time Division Multiple Access (TDMA) scheme wherein time reference on the bus 14 is synchronized to a global time reference. The time reference on the bus 14 is divided into a plurality of bus frames $22_1$, $22_2$, $22_3$ ... $22_n$, which represents the maximum allowable temporal duration between recurring synchronization events (e.g., the broadcast of an epoch packet to be described below). In a preferred embodiment, each node 12 that requires transmission time on the network will have at least one opportunity to transmit data within every frame. As further shown in FIG. 2, each frame 22 is further divided into a plurality of time slots $24_1$, $24_2$ ... $24_n$. Each time slot 24 represents the amount of time allocated to the transmission of data originating with a particular node 12 assigned to that slot. The foregoing insures that a minimum bandwidth will be available for each node to transmit data, inasmuch as no two nodes 12 are configured to share the same time slot within a collision domain.

The frame interval (i.e., the cycle time from the beginning of one frame 22 to the beginning of the next succeeding frame 22) and the number of time slots, the size of each slot and the "ownership" of each time slot is determined, in a preferred embodiment, when network 10 is designed. Such information is thereafter stored in a time slot assignment table 30 (best shown in FIG. 4). The time slot assignment table 30 is transmitted to each node 12 at the start of each frame 22, and is contained in a special packet called an epoch packet, designated by reference numeral 26 in FIG. 2. In one embodiment, each frame 22 has the same temporal duration and each time slot 24 within a frame 22 has the same temporal duration. The time slot assignment table 30 may preferably be static and thus not change after being broadcast to the nodes, thereby reducing or eliminating the shortcomings of a dynamic reservation request system as described in the Background, (i.e., the uncertainty in prior systems in successfully making a request, or, later, in obtaining access to the bus even after making such reservation request due to non-grant of the request). This bus schedule discipline, implemented in each node 12, along with a global time reference (via a bus cadence unit), minimizes or eliminates collisions. Moreover, frame time measurements taken within each node 12 enable internal transmission timer calibrations, which allow bus 14 to "coast" for several minutes if the global time reference is interrupted or otherwise becomes unavailable.

Figure 3:
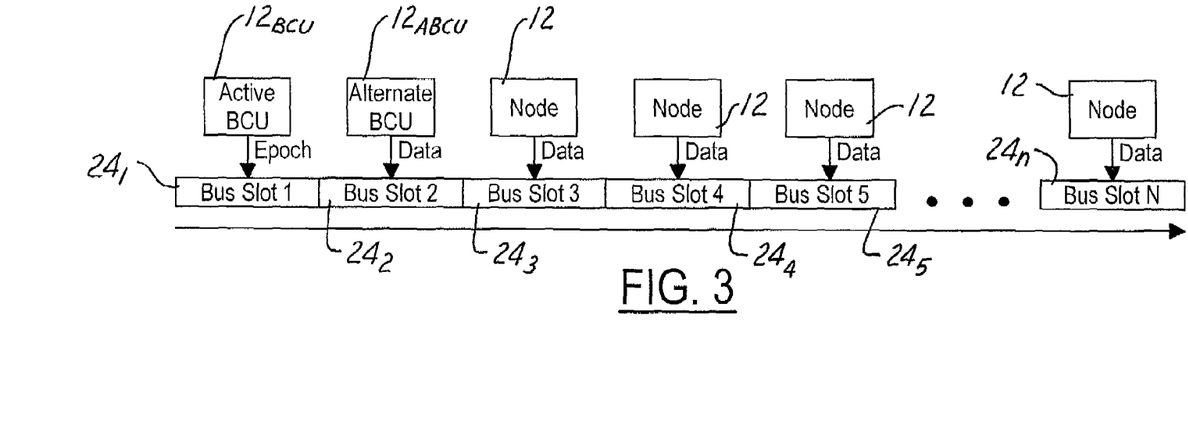
FIG. 3 is a simplified timing diagram showing "ownership" of time slots by nodes on the network.

FIG. 3 is a simplified timing diagram showing a device-to-time-slot assignment scheme of the present invention. The above-mentioned global time reference in network 10 is transmitted from a particular node 12 on the bus 14 designated a bus cadence unit (BCU). The node that is actually establishing the timing on the network is called the active bus cadence unit, $12_{BCU}$. To minimize consequences of a single point failure of the active BCU, network 10 preferably includes a plurality of nodes (e.g., two or three) that are designated and prioritized as BCU candidates using a BCU selection protocol that establishes which of such nodes 12 will become the active BCU (the selection protocol is described in greater detail below).

As also shown in FIG. 3, the active BCU $12_{BCU}$ is configured to transmit the epoch packet during time slot #1, which represents the start of a new frame 22. This is the time from which all subsequent node transmissions are referenced (subject to calibration, described in greater detail below). An alternate BCU, designated by reference numeral $12_{ABCU}$, is assigned to time slot 2, and may be called upon to become the primary, active BCU in network 10 should the active BCU $12_{BCU}$ fail for some reason. The remainder of the bus time slots 24 may be assigned to respective nodes 12 for transmission of data. It bears emphasizing that, as to each time slot, no more than one of the plurality of nodes 12 may be assigned to any particular time slot for data transmission within a collision domain. However, the converse is not true. Any particular node 12 may be assigned one or more time slots. That is, any particular node 12 may "own" one or more time slots. The assignments indicate the identity of the node 12 permitted to transmit packets onto the network during the assigned time slot. Note that the BCU does not control packet transmission directly. Each node 12, rather, controls its own transmissions based on, among other things, the epoch packet as a clock reference, and the time slot assignment table 30 referred to above.

Figure 4:
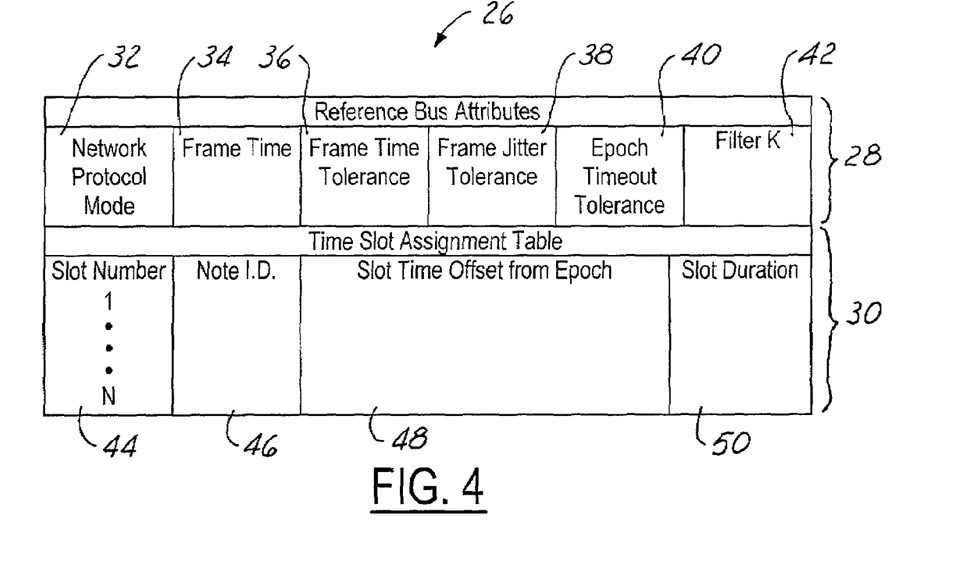
FIG. 4 is a simplified representation of a data structure that includes, among other things, a time slot assignment table.

FIG. 4 shows, in greater detail, a data structure contained in epoch packet 26. Epoch packet 26 performs various functions. The first function is to provide a time reference that all the other nodes use to synchronize their own data transmissions. In a preferred embodiment, this time reference is derived from the time of receipt of the epoch packet 26, as opposed to any particular timing information, or beat pattern, or the like contained within the epoch packet itself. A second function is to provide the identification of which node "owns" each time slot 24 in a frame 22. This information is carried in a time slot assignment table. This prevents two or more nodes from attempting to transmit simultaneously, which would cause a collision on bus 14 and impact the determinism on bus 14. A third function is to request protocol mode changes on bus 14, and to deliver BCU status information to the receiving nodes.

With continued reference to FIG. 4, the data structure in epoch packet 26 includes a plurality of reference bus attributes, designated collectively by numeral 28, and a time slot assignment table 30. Reference bus attributes 28 include, without limitation, a network protocol mode 32, a frame time 34, a frame time tolerance 36, a frame jitter tolerance 38, an epoch timeout tolerance 40, and a filter parameter 42.

The reference bus attributes 28 are used to specify nominal operating characteristics of the bus as well as error limits. The reference bus attributes may then be used by the nodes 12 in their respective operations, including performing diagnostic operations. In particular, these reference bus attributes 28 may be compared with corresponding measured bus attributes to perform such diagnostics.

The network protocol mode 32 defines one of two modes of operation of network 10 in a constructed embodiment. The first mode of operation is a strict Time Slot Protocol (TSP) mode of operation and the second mode of operation is a non-TSP mode of operation. The network protocol mode 32 may comprise data indicative of which mode the bus 14 is to operate. Principally, bus 14 is contemplated to operate in the TSP mode according to the present invention. In the TSP mode, the protocol, time synchronization and transmission envelope protection features described herein would be in effect.

In the non-TSP mode, however, any particular node 12 is configured to respond to packets directed to it via a unicast, multicast or broadcast packet. During data loading, for example, packets may be unicast (i.e., addressed to a single, particular node having a certain destination address). Since network 10 may comprise an architecture that, for critical systems, may involve multiple buses, the remaining buses (i.e., those not used for specific data loading) can continue to be used for system communication purposes.

Frame time parameter 34 may comprise data defining a nominal, designed, frame duration for each frame 22. Alternatively, parameter 34 may be expressed as a frequency (Hz) or rate.

Frame time tolerance parameter 36 provides a measure of a maximum (e.g., in an absolute sense), allowable divergence of a measured frame time relative to the reference frame time. The frame time tolerance parameter 36 may alternatively be expressed as a frequency, in which case tolerance parameter 36 specifies the maximum measured frequency or rate variation relative to reference parameter 34. Each node 12 may be configured to generate an error or an alarm when the tolerance parameter 36 is exceeded during operation.

Frame jitter tolerance 38 provides a reference of the maximum allowable divergence between two consecutive frames (e.g., the measured frame rate of the present frame, in Hz, as compared with the measured frame rate for the prior frame). Each node is configured to generate an error or alarm when the tolerance parameter 38 is exceeded during operation.

Epoch time out tolerance 40 provides a reference as to the maximum allowable time a node will wait, without receiving an epoch packet 26, before generating an error message.

Filter parameter 42 comprises data used by a node in filtering measured frame intervals in order to calculate a calibrated frame interval. In one embodiment, the parameter 42 includes data specifying the number of prior frames over which to calculate a weighted average frame interval (or rate). This will be described in greater detail below.

With continued reference to FIG. 4, time slot assignment table 30 includes slot number identification information 34, node identification information 46, time slot offset information 48 (from the epoch packet), and slot duration information 50. Time slot assignment table 30 includes a plurality of entries, which may be one entry for each time slot in frame 22. Time slot number information 44 is a first field that identifies the time slot number to which the rest of the fields in that entry are associated. Node identification information 46 is a second field that provides identifying information of the node, more specifically, information identifying the device 18 that "owns" the associated time slot set forth in the first field. In one embodiment, node identification information 46 may comprise an Ethernet address associated with the node 12. In an alternate embodiment, the node identification information 46 may comprise an Internet Protocol (IP) address.

Time slot offset information 48 is a third field that includes data indicative of a time slot offset, which, in one embodiment, is taken relative to the receipt of the epoch packet 26 (i.e., from the beginning of the frame). The offset, in-effect, defines how long a node must wait after the beginning of the frame before it will be permitted to transmit on bus 14.

Slot duration information 50 is a fourth field that contains information indicative of a slot duration of the time slot for that entry in table 30. In one embodiment, each time slot 24 in a frame 22 may have an equal duration. In an alternate embodiment, however, the slot duration may be specified so as to establish slots of varying widths on a time slot per time slot basis.

It should be understood that the foregoing information in epoch packets 26 is exemplary only and not limiting in nature. For example, in an embodiment where the slot duration for each time slot 24 in a frame 22 is equal, fields 48 and 50 may optionally be omitted inasmuch as the destination node, knowing the fixed slot duration, may be configured to calculate its own offset based on the time slot assignment, and a calibrated frame interval.

Figure 5:
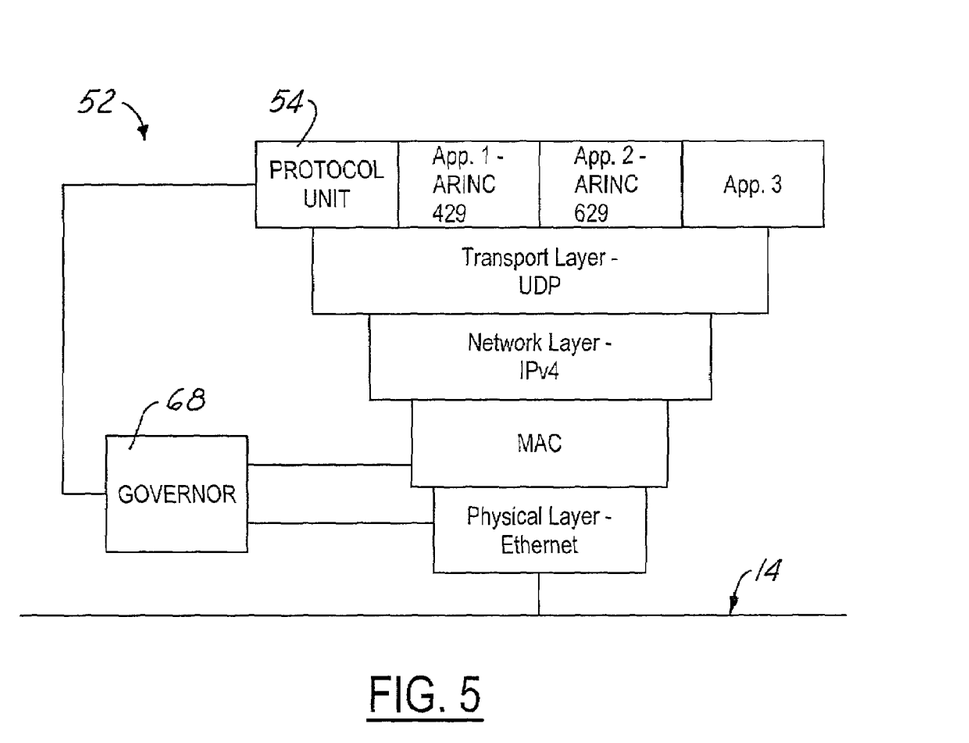
FIG. 5 is a simplified, layer-by-layer diagram showing an exemplary relationship of one embodiment of the present invention to standard ISO layers.

FIG. 5 is a simplified "layer" view of a Time Slot Protocol (TSP) 52 according to the invention. TSP 52 may be implemented at each node 12 in software, in hardware, or as a combination of both. FIG. 5 shows a physical layer (which may be Ethernet), a Media Access Control (MAC) layer, a network layer, a transport layer, and an uppermost, application layer. TSP 52, according to the invention, includes a protocol processing unit application 54, and a TSP governor 68. In a preferred embodiment, protocol processing unit 54 may be implemented in software and governor 68 may be implemented in hardware (i.e., to assure that transmissions from the node occur only during the correct time slot or slots). Governor 56 is configured to enforce a node's transmission envelope, as described in greater detail below. The protocol processing unit 54 performs various functions including generation of epoch packet 26.

Figure 6:
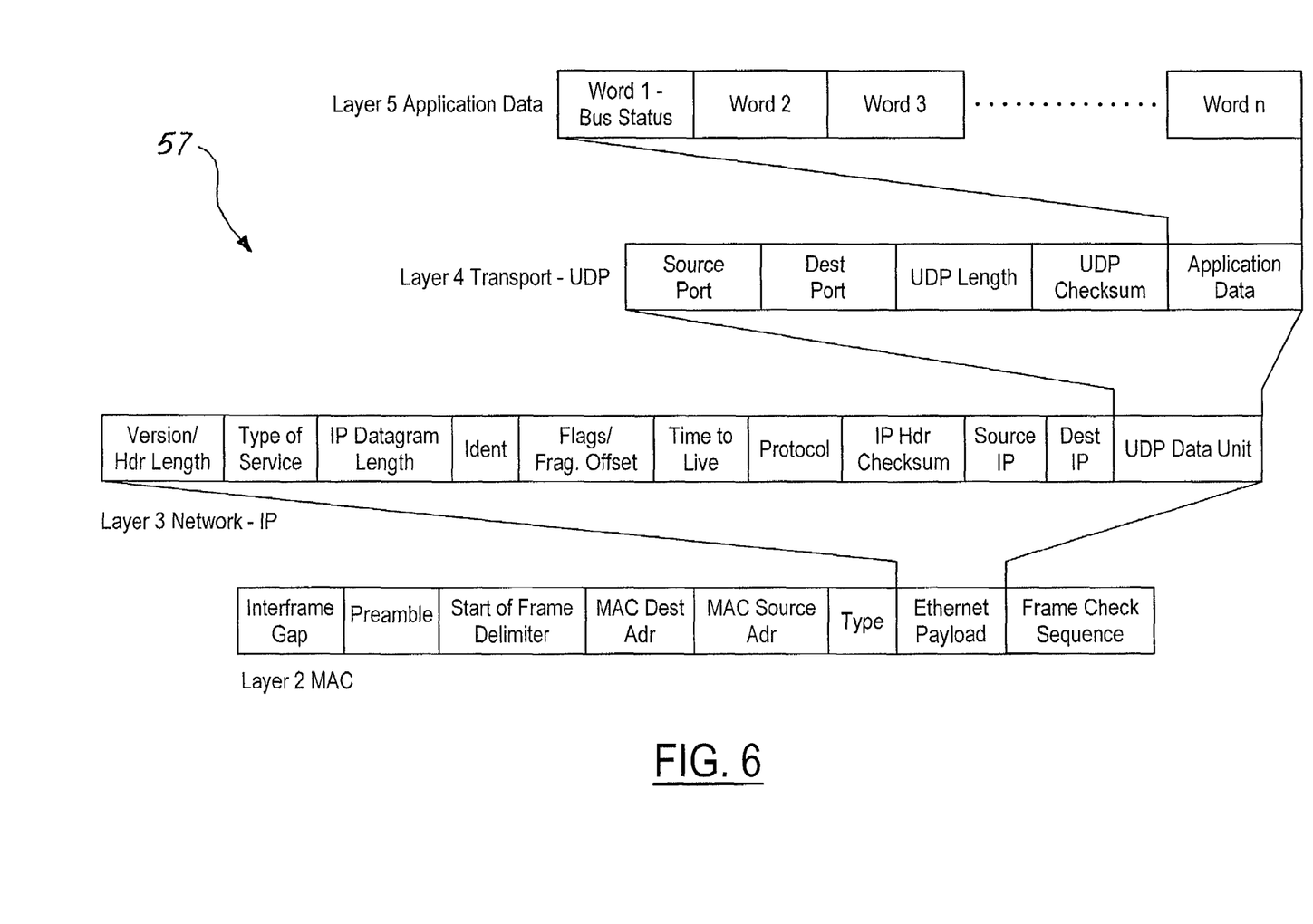
FIG. 6 is a schematic diagram view illustrating encapsulation of application data according to the invention.

FIG. 6 shows an encapsulation scheme 57 according to the present invention. When an application program (running on a node 12) generates application data, it may be encapsulated, in one embodiment, in standard UDP/IP/Ethernet packets. This process is shown in FIG. 6. It should be understood that the User Datagram Protocol (UDP), the Internet Protocol (IP), and the Media Access Control (MAC) protocol layer of Ethernet are all well-known to those of ordinary skill in the art, and need not be described in further detail. In this regard, the epoch packet 26 is considered "application" data generated by protocol unit 54. The epoch packet 26 would be subject to the encapsulation mechanism of FIG. 6.

Figure 7:
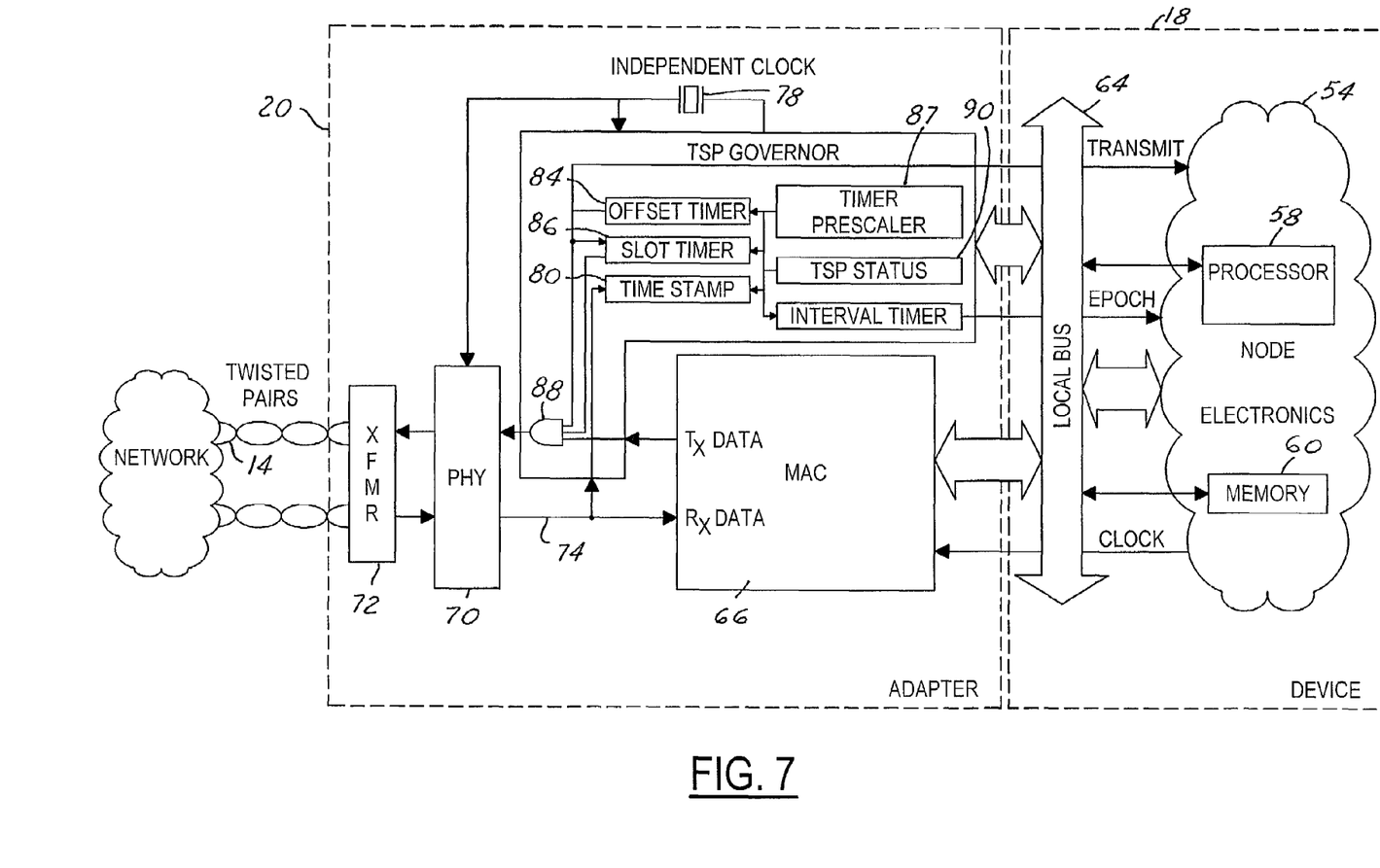
FIG. 7 is a block diagram view showing the adapter and device portions of a node of FIG. 1 in greater detail.

FIG. 7 shows, in greater detail, device 18 and adapter 20 in accordance with the invention (which together comprise a node 12). Device 18 may include a main processor unit 58, a main memory 60, and a local bus 64. The components 58, 60 and 64 may be configured, via pre-programmed routines stored in memory 60, to execute and perform the functionality of TSP 52, specifically including the functionality of the protocol processing unit 54, all as described herein. However, device 18 may also be configured to execute various other application programs in order to accomplish other functions of device 18 (other than the communication protocol of the present invention).

Adapter 20 provides an interface to bus 14, and is configured to allow device 18 to access network 10 for transmitting packets during one or more assigned time slots. Adapter 20 includes a Media Access Control (MAC) unit 66, a TSP governor 68, a physical (PHY) interface 70, and a transformer 72.

MAC 66 is configured to receive incoming packets from the network 10 on a receive (RX) data line 74, and strip off MAC layer headers and the like, to recover the underlying packet (i.e., the reverse mechanism of FIG. 6). The governor 68 monitors the receive (Rx) data lines 74 to time stamp packets (more on this below). MAC 66 also includes a transmit (TX) data line 76, which is configured to output outgoing data packets destined for network 10, and which originate from protocol processing unit 54. MAC 66 encapsulates such originated packets as per FIG. 6. MAC 66 may comprise conventional components known in the art.

In a preferred embodiment, governor 68 is provided in hardware, although it should be understood that the functions to be described for governor 68 may be implemented, albeit with a lower degree of determinism, in software. TSP governor 68 is configured to facilitate measuring frame intervals, which allow calculation of a calibrated frame interval for improved accuracy in synchronization. Governor 68 is further configured, through timers or the like, to control transmission of packets onto the network during the node's transmission envelope (as calibrated). Moreover, governor 68 is configured to enforce the transmission envelope by way of hardware. As shown in FIG. 7, governor 68 includes an independent clock 78, a means or circuit 80 for time stamping incoming packets arriving at the node, an interval timer 82, slot offset timer 84, a slot timer 86, a timer prescalar 87, a hardware pass gate 88, and a time slot protocol status 90.

Governor 68 is coupled to MAC 66 and is configured to facilitate measuring frame intervals based on incoming packets. In this regard, time stamping means 80 is configured to time stamp each packet that is received by MAC 66. Governor 68 may pass the time stamped epoch packets 26, or at least the time stamped information associated with successive epoch packets 26, via local bus 64 to protocol processing unit 54. Protocol layer processing unit 54 may then be configured to compare the time stamps in order to measure a frame interval. Specifically, protocol processing unit 54 is configured such that if the packet received is an epoch packet 26, it retrieves the governor time stamp associated with the received epoch packet 26 and saves the value. When the next epoch packet 26 is received by MAC 66, it is also read by the governor 68, and is time stamped. The protocol processing unit 54 (i.e., the TSP layer software) takes the difference between the time stamps of successive epoch packets as a measurement of the bus frame interval. The measured frame interval is filtered by processing unit 54 with past measured frame interval values to remove any measurement jitter. The calibrated frame interval may then be used by governor 68. In-effect, the extent of any difference between the node's frame interval tick count and the calibrated frame interval (i.e., the new, synchronized tick count) is driven to zero. Usage of the calibrated frame interval will be described in greater detail below. In one embodiment, time stamping means 80 may comprise a programmable timer. The timer prescalar 87 is adjusted to minimize the difference between the adapter time and the network time.

Governor 68 further includes means for controlling transmission of packets onto the network 10 during the assigned one or more time slots, using calibrated slot offset and calibrated slot duration values. The means for controlling such transmission include the interval timer 82, offset timer 84, and the slot timer 86. The interval timer 82 is configured to be loaded with the epoch time. The slot timer 86 is configured to be loaded with the calibrated slot duration, also referred to above (and which will be described in greater detail below).

The interval timer 82 is configured to generate a signal when the epoch should occur, which is fed to offset timer 84. When the slot time is active, the MAC 66 may transmit during its own slot.

Pass gate 88 requires that both the transmit enable signal 84 and the transmission envelope signal 86 output to be high in order to pass data incoming on its third input terminal.

The slot timer 86 works with the offset timer 84 and generates or asserts an output signal for the duration of the time slot or slots "owned" by device 18. Interval timer 82 and slot timer 86 thus cooperate to produce a transmission envelope adapted to control transmission onto bus 14 of packets being produced at the transmit data output line 76 of MAC 66. This allows for controlling access to the network 10 only during the assigned one or more time slots. The interval timer 82 and slot timer 86 operate off of calibrated timing parameters, which ensure proper synchronization between and among the various devices 18 coupled to bus 14 by way of respective adapters 20. Thus, for example, should MAC 66 continue to produce outgoing packets on transmit data line 76 destined for bus 14 after the assigned time slot has ended, gate 88 would be operative to block such transmissions, inasmuch as the transmission enable signal would be deasserted by offset timer 84, and/or slot timer 86. The duration in which transmission onto bus 14 is permitted is referred to herein as the transmission envelope (TX ENVELOPE).

TSP status block 90 is configured to indicate if MAC 66 has attempted to transmit onto bus 14 during a restricted time.

In sum, governor 68 provides a variety of functions, including (i) time stamping function of all received packets; (ii) enabling transmission on bus 14 only during assigned time slot or slots (via hardware); (iii) timing each data transmission (in one or multiple time slots) and terminating such transmission when the data transmission from MAC 66 is no longer than allowed (via hardware); (iv) measuring frame intervals (i.e., the time between epoch packets 26); (v) providing TSP status, including an indication of whether MAC 66 has attempted to transmit out of its assigned time slot or slots; and (vi) providing a real time counter to be used to schedule transmissions.

Figure 8:
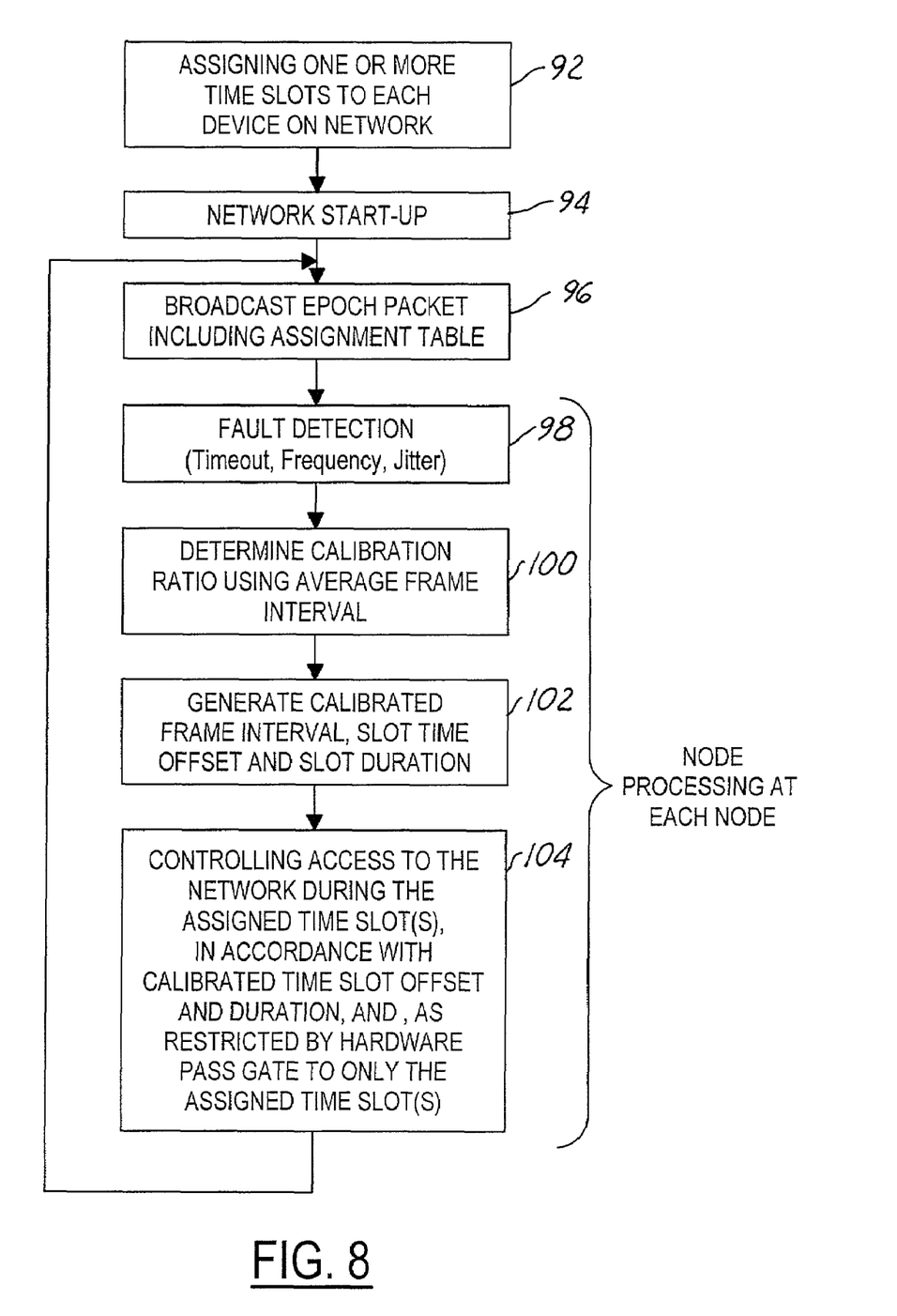
FIG. 8 is a flow chart illustrating a method of operating a network according to the present invention.

FIG. 8 is a flowchart showing the overall, basic methodology according to the present invention.

Step 92 involves assigning one or more time slots to each device on network 10. To ensure deterministic access to the network, no two or more devices within a collision domain may be assigned to any one particular time slot. Step 92, preferably, is performed at the time the design of network 10 occurs, and may involve the use of a computer-implemented tool that would facilitate a human user in making the time slot assignments, and generating a time slot assignment table 30. The method then proceeds to step 94.

In step 94, network 10 enters a start-up phase. Particularly relevant is the self selection of a bus cadence unit (BCU). As described above, there are potentially several nodes 12 which have a BCU capability. Any node 12, generally speaking, that has general processing capability can host the relatively straightforward BCU control software, which, among other things, formats the data structure of FIG. 4 into a packet. At the design time of network 10, a plurality of nodes 12 that are capable of performing the BCU function are assigned the role of candidate BCUs (e.g., typically two or three). In one embodiment, a unique priority is then assigned to each candidate BCU. On power-up, each candidate BCU will listen for an epoch packet. When they receive an epoch packet, they will become a normal node (i.e., not a BCU node). If they do not receive an epoch message, they will (in the order of the unique priority mentioned above), in turn, take on the role of a BCU, and begin to transmit an epoch message. Through the foregoing, network 10 is assured of having a BCU to set network timing. In addition, including multiple candidate BCUs in network 10 has the further advantage of managing failures of the active BCU during run time. Multiple candidate BCUs, in-effect, provides a redundancy management system. Thus, the network has the ability to detect a fault of one BCU, and to designate another node to become the active BCU. The method then proceeds to block 96.

In block 96, the active BCU broadcasts an epoch packet 26 to the nodes 12 on network 10, the epoch packet 26 including the time slot assignment table 30. As described above, epoch packet 26 comprises application layer data, which means that the epoch packet 26 may, in one embodiment, be transmitted using standard UDP/IP/Ethernet formatting (see the encapsulation approach in FIG. 6). From a network protocol standpoint, data for the epoch packet 26 is no different than any other application layer packet transmitted on network 10. Epoch packet 26 is a broadcast packet that defines and identifies the first time slot 24 of every frame 22. This allows all nodes 12 on network 10 to receive epoch packet 26 substantially simultaneously. As described above, MAC 66 of receiving nodes receives the epoch packet 26 on receive data line 74, and passes it to processor 58. TSP governor 68 also receives packets on receive line 74 and is configured to accurately identify and time stamp each epoch packet 26. The process then proceeds to steps 98, 100, 102, and 104 (node processing).

Steps 98-104 relate to node processing, which occurs at each node. At step 98, the receiving node (via TSP governor 68 and protocol processing unit 54) is configured to detect various faults or errors on the network. Specifically, various parameters are checked for compliance, and which include a time out error, a frame frequency error, and a frame jitter error, among others. Each node 12 applies the following described checks with the receipt of each epoch packet 26, to detect BCU, bus or receiving anomalies.

First, if an epoch packet 26 is not received by node 12 within the time defined by the epoch time out tolerance 40, then node 12 generates an epoch time out error. Second, each node 12, according to the invention, is required to measure the time interval between receipt of successive epoch packets ("measured frame interval" or "measured frame rate"). If the absolute value of the difference between the measured frame interval of the most recently received epoch packet 26 and the expected frame interval is greater than the frame time tolerance parameter 36, then node 12 is configured to generate a frequency error. In this regard, it should be understood that frequency, and interval, are reciprocal terms. That is, the frame frequency or rate may be determined by taking the reciprocal of the frame interval time. It bears emphasizing that both (i) an elongated frame interval, or (ii) a foreshortened frame interval that varies from the nominal interval beyond the frame time tolerance parameter 36, will generate the above-described error, since it is based on an absolute value. Third, jitter tolerance is checked. Specifically, the difference between two consecutive measured frame intervals, if greater than the frame jitter tolerance parameter 38, will generate a jitter error. These abnormal conditions, along with any other received data anomalies, are reported in messages by each node as part of a regular data transmission. A head-end node may be configured to use these various messages to formulate an overall bus health status, based on a consensus view of all nodes. If none of the above-described error conditions are found, further processing of the most recent measured frame interval is made. The inventive method proceeds to step 100.

In step 100, each receiving node 12, for example, by way of protocol processing unit 54, determines a variety of calibration parameters. In step 100, a calibration ratio is determined using an "average" frame interval. The step of determining the calibration ratio includes the substep of computing an "average" measured frame interval based on the last K measured frame intervals, where K is the filter parameter 42 from the epoch packet 26, best shown in FIG. 4. It should be understood that "average" may take on a variety of meanings, including without limitation a simple numerical average. The purpose of the filtering is to remove measurement jitter. The calibration ratio may then be determined in accordance with equation (1) set forth below.

$$\text{calibration ratio} = \text{average measured frame interval} / \text{frame time} \quad (1)$$

The "frame time" referred to in equation (1) is the nominal, designed frame time, as it appears in frame time parameter 34, shown in FIG. 4.

In step 102, node 12, by way of protocol processing unit 54, determines a calibrated frame interval (CFI), a calibrated slot time offset and a calibrated slot duration. Protocol processing unit 54 accomplishes the foregoing through calculation of equations (2), (3) and (4) as shown below.

$$\text{calibrated Frame Time} = \text{calibration ratio} \times \text{Frame Time} \quad (2)$$

$$\text{calibrated Slot Time Offset} = \text{calibration ratio} \times \text{Slot Time Offset} \quad (3)$$

$$\text{calibrated Slot Duration} = \text{calibration ratio} \times \text{Slot Duration} \quad (4)$$

The "Frame Time" referred to in equation (2) refers to the actual, measured frame time based on the most recently received epoch packet 26. The Slot Time Offset and the Slot Duration parameters referred to in equations (3) and (4), respectively, are drawn from time slot assignment table 30 for the time slot or slots assigned to the node in which the described processing occurs.

The foregoing calibrated parameters are used by the node to determine its transmission slot and transmission duration. The node is required to adhere to its allocated network access time. This calibration mechanism synchronizes all the nodes on network 10. Once network synchronization has stabilized, the network can continue to operate, even without a BCU, for a period consistent with the precision of the node's frame interval measurement and the time margin specified between slots. The time margin will be described below, but is in the nature of a guard band at the beginning and end of each time slot. The foregoing stability allows sufficient time for the network to switch over to an alternate BCU should the active BCU fail. The method then proceeds to step 104.

In step 104, the node, through TSP governor 68, allows access to network 10 only during the assigned time slot(s), in accordance with the calibrated time slot offset and duration. As described above, the calibrated parameters are loaded into various timers in governor 68, which enforce the transmission envelope for the node. The method then loops, and the process is repeated beginning with step 96.

Figure 9:
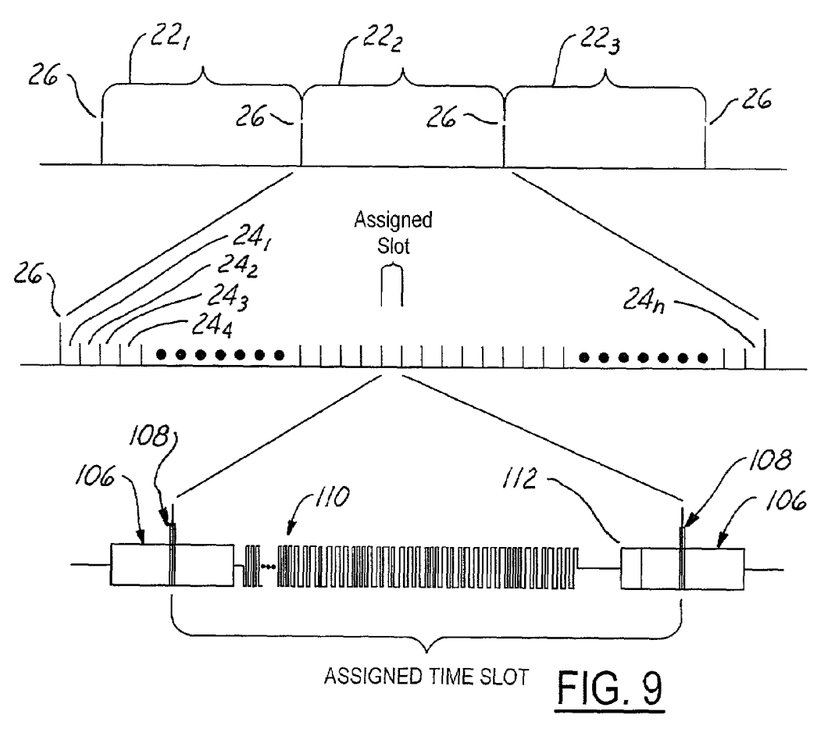
FIG. 9 is a timing diagram illustrating synchronization features of the present invention.

FIG. 9 is a simplified timing diagram showing the relationship between bus frames 22, time slots 24 and the timing arrangement of a particular time slot. At the top of FIG. 9, several frames, namely frames $22_1$, $22_2$ and $22_3$, are shown. Each of the frames 22 begins with an epoch packet 26. In the middle of FIG. 9, a single frame 22 is expanded wherein a plurality of tick marks are illustrated to indicate the individual time slots $24_1$, $24_2$, $24_3$, $24_4$ . . . $24_n$. The bottom of FIG. 9 shows a single time slot 24 in detail. FIG. 9 also shows a guard band 106, clock jitter 108, a user data packet 110, an inter packet gap (IPG) 112 and another guard band 106.

Guard band 106 is inserted at the beginning and at the end of each time slot 24. Guard band 106 defines a time interval in which no transmission of data is to occur. Guard band 106 also allows for a predetermined amount of clock jitter 108 to occur without interfering with the transmission of the user data packet 110. It should also be noted that the time slot protocol according to the invention observes the standard Ethernet, interpacket gap 112. Accordingly, it is possible to transmit multiple (e.g., two) packets within a single time slot, provided the other timing constraints (e.g., guard band) are observed.

With continued reference to FIG. 9, one aspect of the present invention relates to improvements in the synchronization of data transmission over the network. There are several contributors to timing jitter of data within an allocated time slot, which if left uncorrected, could cause synchronization failures. Each of such contributors will be addressed in turn, with a further description of how the present invention minimizes and/or eliminates such jitter.

One source of timing jitter relates to clock frequency variation. For example, independent clock 78 (best shown in FIG. 7) may comprise a commercially available clock oscillator, which may have a tolerance of 50 $ppm^3$ or less. The resulting clock differences among the various nodes in network 10 may thus result in an overall variance as high as 100 $ppm^3$ (i.e., plus and minus 50 $ppm^3$). Under this scenario, clock differences between nodes (at the 100 $ppm^3$ difference) could be as high as 4 microseconds (assuming a 20 microsecond epoch frame interval). According to the invention, TSP governor 68 includes a programmable timer 87 that may be configured to reduce the timing difference for a node to less than 1 microsecond per frame. The foregoing clock variances may be considered to be part of (and subsumed under) guard band 106, which would not otherwise reduce data bandwidth on the bus. However, the reduced jitter would prevent or reduce node drift that would occur should a BCU fail. Otherwise, collisions could result in as little as 2.5 seconds. However, with the TSP governor 68, and the correction of the timer prescalar 87 to the calibrated frame interval, allows extended operation of the bus in the absence of a regular epoch packet.

Variation in how fast the software responds is another contributor to timing differences between nodes. In this regard, there are at least two components: first, the response in receiving and decoding epoch packets 26, and second, the response to a timer interrupt to initiate transmission of an outbound data packet.

The path delay times for receiving/decoding and interrupt/output may be considered constants. However, the differences between any particular responses may be attributed to other tasks that the device 18 (e.g., processor 58) may be performing at that time, which would delay responding to received/decoded packets and interrupt/output of packets. For example, device 18 may be coupled to multiple buses, and one source of delay may be associated with the device servicing two or more other buses. For example, in an avionics embodiment, a dual or triplex bus may be used to allow for redundant interconnections. Thus, this situation is a realistic possibility.

In accordance with the invention, governor 68 includes time stamping means 80 to time stamp received packets. The protocol processing unit 54 (i.e., the TSP software driver in the application layer) uses the time stamp on epoch packets 26 to calculate the "delay" associated with the software response and remove it from the offset time that is used to determine the time to transmit during the user time slot. The time stamp feature implemented by governor 68 therefore virtually eliminates software response variance while processing epoch packets 26.

Also, the programmable timer 87 may be used to trigger the transmission of user data on bus 14. Without governor 68 (i.e., in the case of a software only 10 implementation), variation due to, for example, the unpredictability in servicing one, two or more buses (as well as performing other tasks), may be managed as follows. The protocol processing unit 54 may be configured to delay its transmission time further into the assigned time slot (i.e., beyond the guard band, and reduce, if needed, the amount of data being sent). This dynamic response to software variation maintains the integrity of the network (i.e., the deterministic access characteristic), rather than permitting a fixed duration time slot, which could otherwise overlap with a time slot assigned to or "owned" by another node 12, resulting in a collision.

Figure 10:
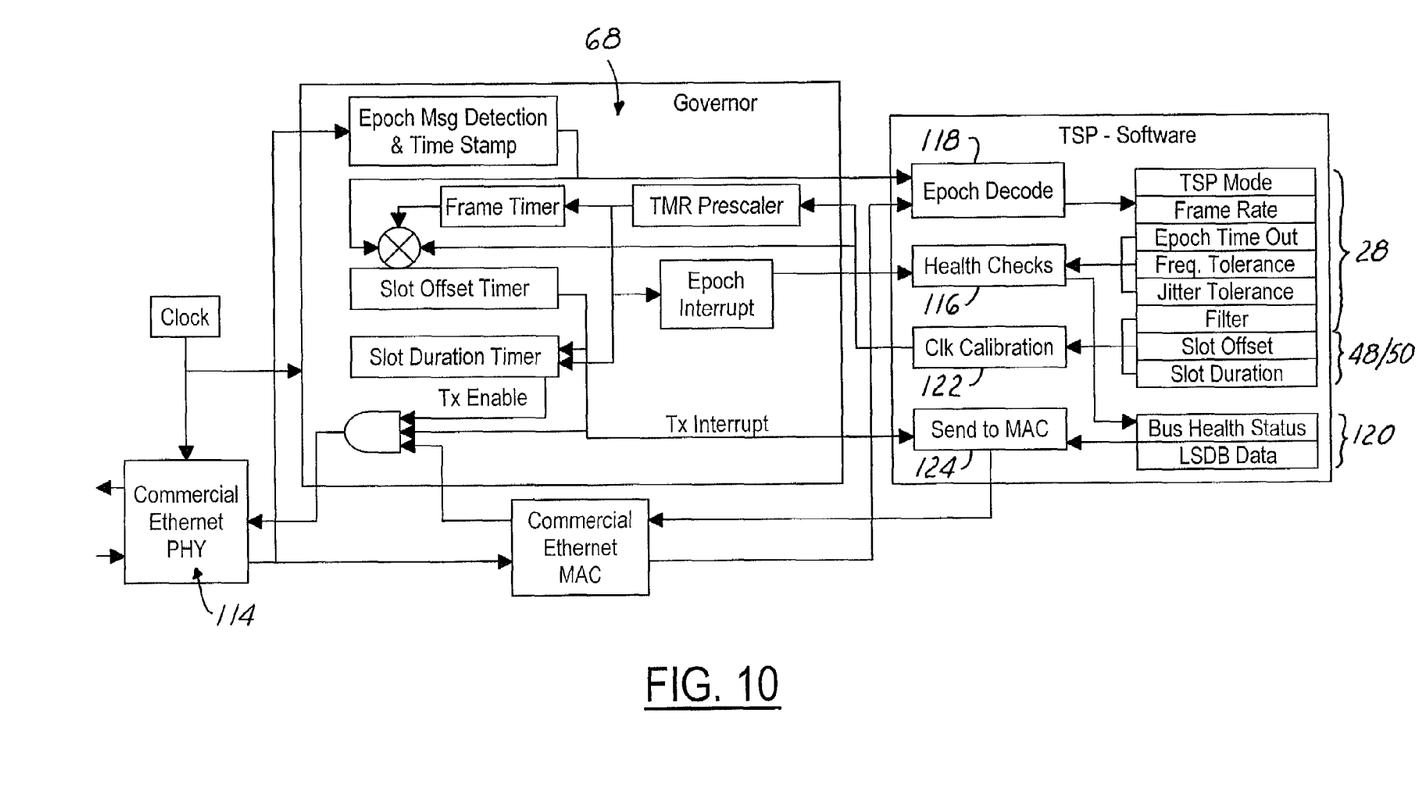
FIG. 10 shows, in greater detail, fault detection and reporting according to the present invention.

FIG. 10 illustrates how various features of the invention provide fault tolerance. In particular, several aspects of the operation of network 10 are monitored and reported via a bus health status, shown in FIG. 10 as bus health status 120. The hardware and software components of the present invention work together to detect faults, report the bus health status and use timing measurements to calibrate the transmission timer. FIG. 10 shows the reference bus attributes 28, and the slot offset and slot duration parameters 48 and 50 (from the time slot assignment table 30) being input at the right hand side of FIG. 10. FIG. 10 further shows a common, commercially available Ethernet block 114, the TSP governor 68 (which is explained in detail in FIG. 7), and Protocol Unit (TSP Software) 54, within which the epoch decode 118, health checks 116, clock calibration 122, and the Send to MAC block 124 which initiates the data transmission.

The bus attributes 28 are provided as inputs to the health checks 116 to be used as tolerances on epoch timeout, frequency and jitter fault detection as described above (FIG. 4). Errors detected are reported to the bus health status 120. Each node announces such faults in the bus health status 120 through transmission of a bus health packet to the other nodes 12 on network 10. A bus redundancy management application program is deployed to execute on one or more selected nodes on the network 10. The role of the redundancy management application is to receive the bus health status from each node, form a consensus view of the overall bus health of the reporting nodes (and reconcile this view with other redundancy management applications running on other nodes, if required), and announce this health back to all the nodes. Suitable responses may then be made, as needed (e.g., designate a different node as the active bus cadence unit, switch to a different bus, or other action to sustain operation of the overall network 10).

Table 1 provides a comparison of different implementations according to the present invention. The first example shows the basic parameters for an implementation at a frame rate of, 50 Hz with 40 possible users. The other examples indicate the effects on maximum data size and maximum bus through put if either the frame rate is changed or the number of users is changed.

TABLE 1

| Parameter | Examples | | | Units |
|---|---|---|---|---|
| | 1 | 2 | 3 | |
| frame rate | 50 | 75 | 50 | Hz |
| Max number of users | 40 | 40 | 100 | slots |
| slot length | 500 | 330 | 200 | usec |
| guard band | 40.4 | 40.4 | 25.4 | usec |
| interpacket gap | 9.6 | 9.6 | 9.6 | usec |
| total slot gap | 50 | 50 | 35 | usec |
| message time/slot | 450 | 280 | 165 | usec |
| equivalent data/slot | 562 | 350 | 206 | bytes |
| TSP header | 54 | 54 | 54 | bytes |
| TSP user status | 4 | 4 | 4 | bytes |
| TSP user seq. no. | 1 | 1 | 2 | bytes |
| max. user data/slot | 504 | 292 | 148 | bytes |
| epoch hdr | 54 | 54 | 54 | bytes |
| epoch bus control | 7 | 7 | 7 | bytes |
| epoch user table | 120 | 120 | 300 | bytes |
| total epoch message | 184 | 184 | 364 | bytes |
| slots/epoch | 1 | 1 | 2 | slots |
| user A429 words/slot | 126 | 73 | 37 | A429 words |
| max. TSP throughput | 8.06 | 7.01 | 5.92 | mbps |
| max. Ethernet throughput | 8.94 | 8.42 | 7.36 | mbps |

It should be understood that the maximum TSP throughput is based on equal slots and total number of users. It should be further understood that the maximum Ethernet throughput is based on users and frame rate, includes IPG and the Ethernet Header.

According to the present invention, a time slot protocol schedules the transmissions from nodes by assigning unique time slots to each node within a reciprocal bus frame at design time. A bus cadence unit (BCU) broadcasts an "epoch" message sent at the start of every bus frame. The epoch message contains node slot and duration assignments. The nodes measure the interval between epoch messages and calibrate the eternal time counting that controls the transmission envelope. Calibration allows the bus to "coast" without a BCU once the cadence is set. Nodes further determine their transmission envelope based on the calibrated frame time interval, assigned to time slot and slot duration. Multiple BCUs may be designated for a bus to eliminate any single point failures that could impact the long term operation of the network. Finally, fault tolerance is achieved by implementing multiple buses with system level redundancy management, based on node health consensus.

The invention claimed is:

1. A method of operating a network having a plurality of devices coupled to a shared bus comprising the step of transmitting an epoch packet indicating the beginning of a frame wherein the frame has a plurality of time slots and wherein the epoch packet includes assignments of the time slots to the devices, and time slot offset and time slot duration information for each time slot assignment;
   determining a transmission time, in each device, using information in the epoch packet; and
   controlling access to the shared bus during one of a plurality of time slots in a frame using a frequency calibration parameter, configured to adjust at least one transmission timer, calculated using measured frame intervals.

2. A method of operating a network having a plurality of devices coupled to a shared bus comprising the step of transmitting an epoch packet indicating the beginning of a frame wherein the frame has a plurality of time slots and wherein the epoch packet includes assignments of the time slots to the devices, and time slot offset and time slot duration information for each time slot assignment; and
   assigning to each time slot no more than one of the plurality of devices within a collision domain, wherein said assignments indicate the identity of the device permitted to transmit packets onto the shared bus of the network during the assigned time slot;
   defining a table that includes said time slot assignments, said table further including time slot offset and slot duration data for each time slot;
   simultaneously sending the table over the shared bus of the network to each of the plurality of devices in said epoch packet.

3. The method of claim 1 wherein said frequency calibration parameter comprises a calibration ratio, said controlling step includes the substep of:
   determining the calibration ratio using a weighted average of the measured frame intervals and a preselected frame interval;
   generating a calibrated time slot offset using said calibration ratio and said time slot offset from said table for one of the plurality of time slots; and
   generating a calibrated slot duration using said calibration ratio and said slot duration from said table for said one of the plurality of time slots.

4. The method of claim 3 further comprising the step of:
   transmitting packets onto the shared bus of the network during said one time slot in accordance with said calibrated time slot offset, and said calibrated slot duration.

5. The method of claim 4 wherein said step of transmitting is Ethernet compliant.

6. The method of claim 4 wherein said transmitting step includes the sub step of:
   restricting transmission of packets by the device associated with said one time slot using hardware gating logic.

7. The method of claim 4 wherein said controlling step is performed with respect to each device on said network during respectively associated time slots.

8. An adapter for allowing a device to access a shared bus of a network for transmitting packets during one or more time slots selected from a plurality of time slots defining a frame, said one or more time slots being assigned to said device, said adapter comprising:
   a physical interface device (PHY) unit configured to receive incoming packets from the bus, said PHY being further configured to output outgoing packets;
   a media access control (MAC) unit;
   a governor coupled to said physical interface device and said MAC;
   a protocol unit configured to process an epoch packet during each frame, receipt by the device of said epoch packet indicating the beginning of each frame, said epoch packet having a table including (i) time slot assignments for devices on the bus, (ii) a time slot offset for each time slot assignment, and (iii) a time slot duration for each time slot assignment; and
   wherein said governor is configured to control transmission of said outgoing packets onto said bus during said assigned one or more time slots in accordance with said time slot offset and duration data.

9. An adapter for allowing a device to access a shared bus of a network for transmitting packets during one or more time slots selected from a plurality of time slots defining a frame, said one or more time slots being assigned to said device, said adapter comprising:

a physical interface device (PHY) unit configured to receive incoming packets from the bus, said PHY being further configured to output outgoing packets;

a media access control (MAC) unit;

a governor coupled to said physical interface device and said MAC;

a protocol unit configured to process an epoch packet during each frame, receipt by the device of said epoch packet indicating the beginning of each frame, said epoch packet having a table including (i) time slot assignments for devices on the bus, (ii) a time slot offset for each time slot assignment, and (iii) a time slot duration for each time slot assignment; and wherein said governor is configured to control transmission of said outgoing packets onto said bus during said assigned one or more time slots in accordance with said time slot offset and duration data, wherein said network includes a bus cadence unit (BCU) configured to transmit the epoch packets.

10. The adapter of claim 9 wherein said governor includes means for timestamping each received packet.

11. The adapter of claim 10 wherein said PHY is Ethernet compliant.

12. The adapter of claim 10 wherein said timestamping means includes a programmable timer.

13. The adapter of claim 9 wherein said protocol unit includes means for measuring frame intervals using respective timestamps of consecutive epoch packets.

14. The adapter of claim 13 wherein said protocol unit further includes means for computing a weighted average epoch-packet frame interval based on a plurality of measured frame intervals.

15. The adapter of claim 14 wherein said governor is configured to control access to said bus using a frequency calibration parameter configured to adjust a transmission timer.

16. The adapter of claim 15 wherein said calibration parameter comprises a calibration ratio, said protocol unit further includes means for determining said calibration ratio based on said weighted average epoch packet frame interval and a predetermined frame interval.

17. The adapter of claim 16 wherein said protocol unit further includes means for calculating (i) a calibrated time slot offset using said calibration ratio and a slot offset selected from said table; and (ii) a calibrated time slot duration using said calibration ratio and a slot duration selected from said table.

18. The adapter of claim 17 wherein said governor includes means for controlling transmission of packets onto said bus during said assigned one or more time slots responsive to said calibrated time slot offset and said calibrated time slot duration.

19. The adapter of claim 18 wherein governor includes a gate for passing said outgoing packets to said PHY onto said bus only during said assigned one or more time slots, as determined, said calibrated slot offset and said calibrated slot duration, to thereby enforce strict deterministic access to said bus.

20. The adapter of claim 19 where said controlling means includes (i) a slot timer configured to be loaded with said calibrated slot duration and (ii) an offset timer adapted to be configured with said calibrated slot offset.

21. An adapter for allowing a device to access a shared bus of a network for transmitting packets during one or more timeslots selected from a plurality of time slots defining a frame, said one or more time slots being assigned to said device for transmission, said adapter comprising:

a physical interface device (PHY) unit configured to receive incoming packets from the bus, said PHY being further configured to output outgoing packets;

a media access control (MAC) unit;

a governor coupled to said physical interface device and said MAC;

a protocol unit configured to generate a transmission protection envelope signal based on data contained in epoch packets received at the beginning of each frame; and wherein said governor further includes a pass gate configured to selectively prevent transmission of said outgoing packets onto the bus outside of said assigned one or more time slots in accordance with said transmission protection envelope signal.

22. The adapter of claim 21 wherein said PHY is Ethernet compliant.

23. An adapter for allowing a device to access a shared bus of a network for transmitting packets during one or more time slots selected from a plurality of time slots defining a frame, said one or more time slots being assigned to said device, said network including a bus cadence unit (BCU) configured to transmit an epoch packet during said frame, said epoch packet comprising timing information and at least one reference bus attribute, said adapter comprising:

a media access control (MAC) unit configured to receive incoming packets from the bus via a physical interface device (PHY), said MAC being further configured to output outgoing packets destined for said bus; and a protocol unit coupled to said MAC and configured to process said incoming packets and generate at least one measured bus attribute corresponding to said reference bus attribute, said protocol unit being further configured to generate a message indicative of a condition of said bus based on said reference bus attribute and said measured bus attribute.

24. The adapter of claim 23 wherein said reference bus attribute is selected from the group comprising an epoch packet timeout attribute, a frame rate attribute, a frequency tolerance attribute, a jitter tolerance and a filter attribute.

25. The adapter of claim 24 wherein said incoming packets being processed by said protocol unit to generate said measured bus attribute from said epoch packets.

26. The adapter of claim 23 wherein said MAC is Ethernet compliant.

27. A method of operating a network having a plurality of devices coupled to each other via one or more hubs comprising the step of transmitting an epoch packet indicating the beginning of a frame wherein the frame has a plurality of time slots and wherein the epoch packet includes assignments of the time slots to the devices, and time slot offset and time slot duration information for each time slot assignment;

determining a transmission time, in each device, using information in the epoch packet; and controlling access to the shared bus during one of a plurality of time slots in a frame using a frequency calibration parameter, configured to adjust at least one transmission timer, calculated using measured frame intervals.

28. A method of operating a network having a plurality of devices coupled to each other via one or more hubs comprising the step of transmitting over the network an epoch packet indicating the beginning of a frame wherein the frame has a plurality of time slots and wherein the epoch packet includes assignments of the time slots to the devices, and time slot offset and time slot duration information for each time slot assignment; and assigning to each time slot no more than one of the plurality of devices within a collision domain, wherein said assignments indicate the identity of the device permitted to transmit packets on the network during the assigned time slot;

defining a table that includes said time slot assignments, said table further including time slot offset and slot duration data for each time slot;

simultaneously sending the table over the network to each of the plurality of devices in said epoch packet.

29. The method of claim 27 wherein said frequency calibration parameter comprises a calibration ratio, said controlling step includes the substep of:

determining the calibration ratio using a weighted average of the measured frame intervals and a preselected frame interval;

generating a calibrated time slot offset using said calibration ratio and said time slot offset from said table for one of the plurality of time slots; and generating a calibrated slot duration using said calibration ratio and said slot duration from said table for said one of the plurality of time slots.

30. The method of claim 29 further comprising the step of:

transmitting packets onto the network during said one time slot in accordance with said calibrated time slot offset, and said calibrated slot duration.

31. The method of claim 30 wherein said step of transmitting is Ethernet compliant.

32. The method of claim 30 wherein said transmitting step includes the substep of:

restricting transmission of packets by the device associated with said one time slot using hardware gating logic.

33. The method of claim 30 wherein said controlling step is performed with respect to each device on said network during respectively associated time slots.

* * * * *